(12) United States Patent
Koenig

(10) Patent No.: US 6,928,853 B2
(45) Date of Patent: Aug. 16, 2005

(54) METHOD AND DEVICE FOR THE HYSTERESIS CORRECTION OF MEASURED VALUES FOR SENSORS WITH EXTENSOMETERS

(75) Inventor: Hans Guenter Koenig, Reinheim (DE)

(73) Assignee: Schenck Process GmbH, Darmstadt (DE)

(*) Notice: Subject to any disclaimer, the term of this patent is extended or adjusted under 35 U.S.C. 154(b) by 89 days.

(21) Appl. No.: 10/415,299

(22) PCT Filed: Oct. 24, 2001

(86) PCT No.: PCT/EP01/12288

§ 371 (c)(1),
(2), (4) Date: Apr. 28, 2003

(87) PCT Pub. No.: WO02/35191

PCT Pub. Date: May 2, 2002

(65) Prior Publication Data

US 2004/0059532 A1 Mar. 25, 2004

(30) Foreign Application Priority Data

Oct. 28, 2000 (DE) .......................... 100 53 667

(51) Int. Cl.⁷ .............................................. G01L 25/00
(52) U.S. Cl. ........................................................ 73/1.08
(58) Field of Search .............................. 73/1.08, 1.13, 73/1.15

(56) References Cited

U.S. PATENT DOCUMENTS

| | | | |
|---|---|---|---|
| 3,709,310 A | | 1/1973 | Cooke et al. |
| 4,691,290 A | | 9/1987 | Griffen |
| 4,909,338 A | * | 3/1990 | Vitunic et al. .............. 177/50 |
| 5,166,892 A | | 11/1992 | Inoue et al. |
| 5,308,931 A | * | 5/1994 | Griffen ...................... 177/25.14 |
| 5,780,777 A | * | 7/1998 | Selig ........................ 177/25.11 |
| 6,002,090 A | * | 12/1999 | Johnson et al. ............. 177/136 |

FOREIGN PATENT DOCUMENTS

| | | |
|---|---|---|
| DE | 2040987 | 3/1971 |
| DE | 69 118580 | 11/1991 |
| DE | 19 741037 | 8/1999 |
| EP | 0051289 | 5/1982 |
| EP | 0457134 | 11/1991 |
| GB | 1479192 | 7/1977 |
| JP | 10 148566 | 6/1998 |

OTHER PUBLICATIONS

Ball et al., "A Stress–Dependent Hysteresis Model for PZT–Based Transducers", Techinal Report #2004–6, SAMSI, Mar. 24, 2004.*
"Finite Element Modelling of Load Cell Hysteresis", G. M. Robinson, Measurement, Institute of Measurement and Control, London, GB, vol. 20, Nr. 2, pp. 103–107, XP004084420, ISSN: 0263–2244.

* cited by examiner

Primary Examiner—Charles Garber
(74) Attorney, Agent, or Firm—W. F. Fasse; W. G. Fasse

(57) ABSTRACT

A transducer including a deformation body with a strain gage produces hysteresis-affected measured values based on the strain of the deformation body. Each measured value is to be corrected by the hysteresis error. For this purpose, a hysteresis model is formed from a recorded loading characteristic curve and the theory of the dipole density of the oriented elementary dipoles in the interior of the deformation body. With the aid of the hysteresis model, and the determined hysteresis-affected measured values, and in connection with the acquired loading history, a correction value is derived and used to correct the hysteresis error.

16 Claims, 3 Drawing Sheets

Fig. 4

```
         FUNCTION HYST2 (x)

C---------------------------------
C    BASIC ROUTINE FOR THE HYSTERESIS MODEL
C    ('HYSTERESIS-GENERATOR-H2-(RAYLEIGH)-TYPE')
C
C    n : NUMBER OF THE ELEMENTARY CELLS (HERE: 100)
C    x : STARTING VALUE NORMED TO 1.0
C    HYST 2 : RETURN VALUE
C---------------------------------
         PARAMETER (n=100)
         INTEGER iphi(n)
C    PRE-OCCUPATION OR SETTING OF THE EDGE OR
C    BOUNDARY phi(r):
C
         iphi(n)=NINT (REAL(2*n)*x)
         ih=iphi(n)

C    DEVELOPING OF THE LOCAL OCCUPATION DENSITY phi(z):
C
         DO 10 i=n-1,1,-1
C
         IF(iphi (i).EQ.0)iphi(i)=n-1
         IF(iphi (i+1) -iphi(i).GT. 1)iphi(i)=iphi (i+1)-1
         IF(iphi (i+1) -iphi(i).LT.-1)iphi(i)=iphi (i+1)+1

C    INTEGRATION OF phi(z) OVER z:
C
         ih=ih+iphi(i)
C
      10 CONTINUE

C    NORMING OF THE RETURN VALUE:
C
         HYST2=2.0* (real(ih)/REAL (n*n)-x)-1.0

C
         RETURN
         END
```

METHOD AND DEVICE FOR THE HYSTERESIS CORRECTION OF MEASURED VALUES FOR SENSORS WITH EXTENSOMETERS

FIELD OF THE INVENTION

The invention relates to a method for the hysteresis correction of measured values in connection with transducers with strain gages, which detect the strain due to a force influence on a deformation body, as well as an apparatus for carrying out the method.

Measured value transducers with strain gages are often utilized for the detection of measured values, whereby the strain gages generate an electrical measuring signal due to a force influence on an elastic deformation body. In this regard, these transducers are predominantly utilized in weighing devices for the measuring of forces, moments or pressures. Such transducers and especially weighing cells or load cells are generally subject to or affected by a hysteresis error, which is recognizable in practice in that two different measured values are provided for the same load, depending on whether the measurement is carried out with a rising or falling load application. The main cause for this ambiguous characteristic curve deviation are frequency-independent damping processes in the material of the deformation body in connection with strains in the elastic range, or a beginning plastification in boundary or limit cases. Besides that, external frictional effects also arise on the force introduction or joint surfaces. Besides other linearity errors, these hysteresis errors are essentially decisive regarding the accuracy of the measurement results.

In practice, these hysteresis errors are often reduced in connection with weighing or load cells and force transducers in that they are compensated to the extent possible by hysteresis effects in the application of the converter elements (strain gages). For this purpose, the strain gages and corresponding adhesives are selected, which comprise a contrary or counteracting hysteresis to the extent possible and thereby keep the total hysteresis error small. The hysteresis error remaining in this manner is, however, subjected to a series scattering, and cannot be removed or corrected even by subsequent processing. Thus, previously, transducers with very small hysteresis errors were produced simply by selection from the series.

A method for the reduction of the hysteresis error has similarly become known from the DE 20 40 987 B2, wherein this method, in a mechanical manner, couples together in a transducer two measuring elements with opposed hystereses. While the hysteresis error can be reduced in this manner, whereby, however, also here, a subsequent processing after the fabrication is no longer possible, so that also here all tolerances caused by the fabrication go completely into the measurement result. Moreover, such an apparatus increases the mechanical structure enormously due to the production of a complicated and costly measurement spring.

Furthermore, for the correction of the hysteresis error, mathematical methods are also previously known from the GB 1 479 192 B and the EP 0,457,134 A2, which mathematical methods are utilized in the output value of the force transducer. Both publications disclose mathematical methods in the form of polynomial approximations, in which, respectively dependent on the loading direction of the weighing system, stored hysteresis correction values are processed with the determined measured values, and thereafter are output as a weight value corrected by the hysteresis error. Since these methods do not take into consideration the local reversal points in the load history, a significant residual error must remain.

SUMMARY OF THE INVENTION

Therefore, it is the underlying object of the invention, to correct a hysteresis error in connection with strain gage transducers, and this at an acceptable expense and effort.

The above objects have been achieved according to the invention in a method for the hysteresis correction of hysteresis-affected measured values in connection with at least one transducer with at least one strain gage, which detects the strain due to a force influence on an elastic deformation body, in which the hysteresis-affected measured values are corrected by a determined hysteresis error, characterized in that a hysteresis model of the transducer is formed in a model circuit from determined loading values of loading of the transducer in a rising loading branch and a falling loading branch of an envelope of the hysteresis and from a dipole density of oriented elementary dipole in an interior of the deformation body, with the aid of which hysteresis model, a respective correction value that serves for the correction of the hysteresis error is derived or calculated for each one of the hysteresis-affected measured values.

The above objects have further been achieved according to the invention in an apparatus for carrying out a method for the hysteresis correction of hysteresis-affected measured values in connection with at least one transducer with at least one strain gage, which detects the strain due to a force influence on an elastic deformation body, in which the hysteresis-affected measured values are corrected by a determined hysteresis error, wherein a hysteresis model is formed from determined loading values of loading of the transducer in a rising loading branch and a falling loading branch of the hysteresis, with the aid of which hysteresis model, and front each determined hysteresis-affected measured value, a respective correction value is derived or calculated and serves for the correction of the hysteresis error, wherein the apparatus is characterized in that a transducer with strain gages is provided, of which the hysteresis-affected measured values are delivered to a model circuit, which is adapted to form from the measured values an auxiliary value, which is coupled in a provided multiplying circuit with the weighting factor formed by a provided weighting circuit to form a correction value, and from which, in a provided summing circuit, under consideration of a respective one of the hysteresis-affected measured values, at the output of which the corrected measured value is made available for further processing or indication.

The invention has the advantage that this correction method is utilizable in connection with all hysteresis-affected transducer systems with strain gages. In this context, it is simply necessary to provide a one-time determination of the loading characteristic curve or individual loading values in rising and falling form, which are sufficient for forming or mapping a hysteresis model, whereupon correction values are derivable for each hysteresis-affected measured value in connection with the model.

Furthermore, the invention has the advantage, for the formation of the respective hysteresis model for the special or specific transducer or the special or specific weighing scale, that only its loading characteristic curve or only a few determinative loading values need to be determined or prescribed, which already takes place for a normal staggered or graduated measurement for the adjustment, without requiring that the entire loading history must be known, so that no particular prior determination of a plurality of coefficients is necessary.

The invention still additionally has the advantage that the hysteresis correction can be carried out both for one individual transducer as well as for a plurality of transducers circuit-connected together, for example in a complete weighing scale, since the entire hysteresis error takes place through a downstream or subsequently circuit-connected numerical signal preparation or processing. Thereby, it is especially advantageous that this takes place in the simplest manner due to the derivation of the model from the existence of elastic dipoles, and therefore also requires only a very small computational effort or expense.

In a particular embodiment of the invention it is advantageous that an adaptation to an unsymmetrical envelope of the hysteresis is also possible, through an additional weighting function, without requiring that the hysteresis model must have been altered.

BRIEF DESCRIPTION OF THE DRAWINGS

The invention will be described in further detail in connection with an example embodiment, which is illustrated in the drawing. It is shown by:

FIG. 4: a computer program of the hysteresis model.

DETAILED DESCRIPTION OF PREFERRED EXAMPLE EMBODIMENTS AND OF THE BEST MODE OF THE INVENTION

Figure 1:
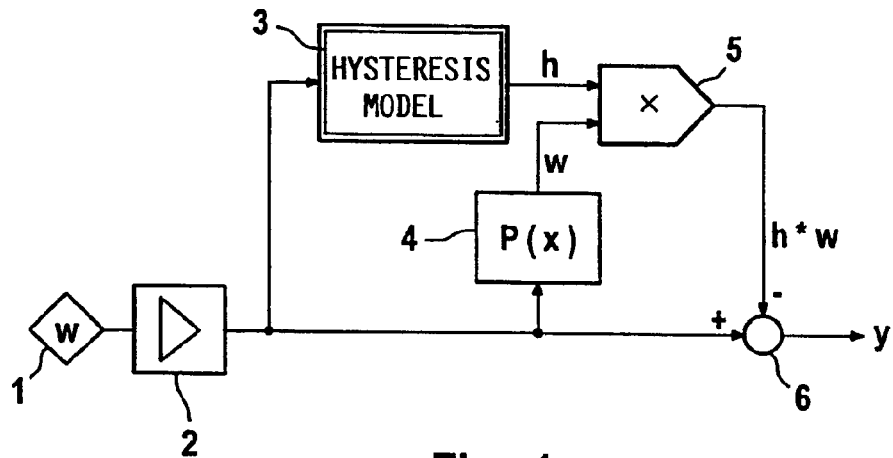
FIG. 1: a block circuit diagram of the invention.

In FIG. 1 of the drawing, the invention is illustrated in connection with a block circuit diagram, which includes a transducer 1 with a pre-amplifier 2, which provides a measured signal x, of which the hysteresis error is corrected by a model circuit 3, a weighting function circuit 4, a multiplying circuit 5 and a summing circuit 6.

The transducer 1 is embodied as a weighing or load cell, which includes an elastic deformation body, onto which strain gages are applied. These emit an electrical signal, that is proportional to the weight loading of the load cell 1. Because this load cell 1 includes a deformation body of an iron alloy, the load cell 1 emits a signal that is subject to or affected by a hysteresis error, of which the non-linear course or progression forms a so-called envelope. This hysteresis-affected weight signal x is amplified in a following pre-amplifier 2 and provided to a model computation circuit 3. Loading values are inputted into this model computation circuit 3, wherein these loading values are run through during a loading of the load cell 1 up to a maximum value and a complete unloading. In this context, beginning from an unloaded state, at least one intermediate value is required in the rising branch, and at least one intermediate value is required in the falling branch. Such a staggered or graduated measurement with several measured values generally is already carried out in the adjustment of the load cell 1 or a weighing scale, so that usually no special input of the necessary loading values is required for this purpose. Moreover, such a loading also does not necessarily have to take place in the first use of the load cell 1 or the weighing scale, because all previous hysteresis-causing measured values are written over because of the measurement up to the maximum value, and therefore can remain disregarded or not taken into account.

The hysteresis model of the model circuit 3 is based on the underlying recognition that the loading history that leads to the hysteresis is developed according to the following steps. For this purpose, a computational model is utilized, that is derived from the geometric interpretation of a bending beam. In the manner of a starting point, one begins in this context from the existence of elastic dipoles, which orient themselves under the influence of an elastic strain field and orient or align themselves in the tension or stress direction similarly like the elementary magnets. In the case of the bending beam, the distribution (dipole density $\phi$) is only to be considered over the height of the spring or of the strain body z. In this context, in a first approximation, all further spatial components can be neglected. Thereby, also the boundary or edge strain $\epsilon_r$ is detectable or acquirable by measurement technology, and the greatest strains arise in the elastic range on the spring or on the deformation body. Thus, it is assumed for the model, that at this point, a partial aligning or orienting of edge dipoles is forced in the direction of the stress variations. In this context, the edge or boundary orientation behaves according to the following mathematical function:

$$\phi_{(zr)} = C \cdot \epsilon_r$$

wherein $\phi$=dipole density;

z=spacing distance from the neutral phase in the direction toward the strain edge or boundary;

r=characteristic parameter for edge or boundary values;

$\epsilon_r$ =strain at the edge or boundary area; and

C=factor for hysteresis strength.

The dipole density $\phi$ of the oriented elementary hystereses in the interior of the body thus arises or is determined from the distortion or deformation history of the deformation body according to the following mathematical function $$\epsilon_r = \Sigma \Delta \epsilon_{rn}$$

$$\epsilon_{rn+1} = \epsilon_{rn} + \Delta \epsilon_{rn+1}$$

wherein n=number of the load steps.

Figure 2:
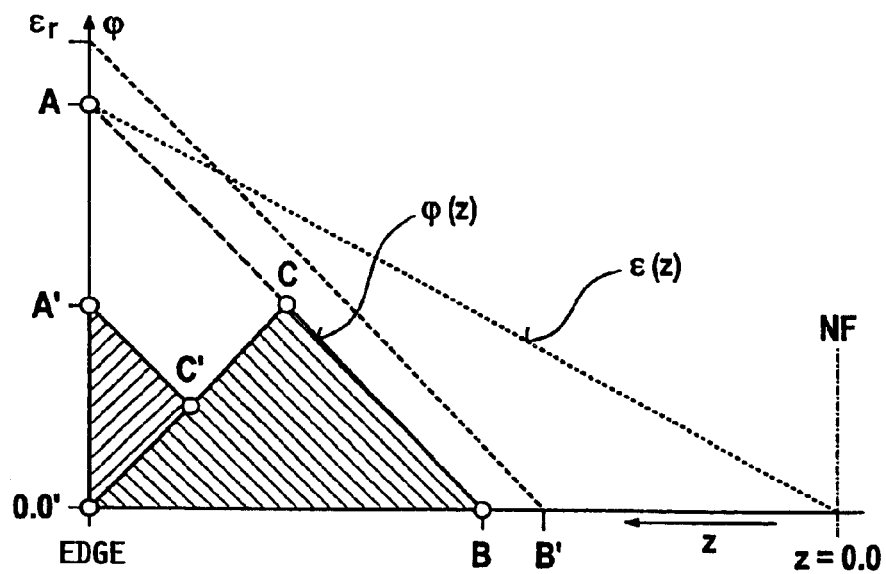
FIG. 2: a development of the density function dependent on the strain history.

For reasons of symmetry, a piecemeal or piece-wise linear distribution function $\phi$ is to be assumed over the height z in a bending beam. Therefore, the development of the density function $\phi$ can be developed according to FIG. 2 of the drawing with knowledge of the loading history. The course or progression of a first loading and further loading cycles is illustrated in FIG. 2 of the drawing. One begins with $\phi$=constant=0.0 and $\epsilon_r$=0.0. The boundary or edge strain is increased to $\epsilon_r$=A. Thereby, the density function becomes adjustingly set to the course or progression A-B. If next the initial condition $\epsilon_r$=0.0 is again forced, then the point C arises, and the oriented region 0-C-B remains behind in the interior. If the boundary or edge strain is again increased, thereby the front A'-C' is formed parallel to A-B. Upon reaching $\epsilon_1$, point C' transitions into C, whereby a cancellation of both points takes place. A sign reversal in the strain velocity causes a new instability or discontinuity point in $\phi$ at the body edge. This point can move or wander only in the direction toward the neutral fiber (NF). Fronts between two instability or discontinuity points are immovable, only the line segment between the edge and the first point is shifted in a parallel manner. Points that run together again mutually cancel each other. With a sufficiently large boundary or edge strain, independent of the sign, every older internal structure is overwritten by the new front B'. If thereby two instability or discontinuity points cancel each other out, there thus arises a kink or bend in the characteristic curve branch. In a weakly damped decaying oscillation, beginning with the maximum amplitude in $\epsilon_r$, the entire stored information is cancelled or erased.

The failure or fault moment of a single individual fiber is to be obtained from the geometric conception, through the density function $\phi$ that is multiplied with the fiber spacing z. An internal hysteresis moment $M_h$ or an internal hysteresis force $F_h$, which is held in equilibrium balance by a boundary or edge strain error $\epsilon_h$, is obtainable from the integration over z and a multiplication with the factor C (hysteresis strength). This remaining hysteresis moment $M_h$ or hysteresis force $F_h$ arising out of the loading history, arises or is given according to the following mathematical function:

$$M_h = C_m \cdot \int_{-zr}^{+zr} \varphi(z) \cdot z \cdot dz \text{ or } F_h = C_f \cdot \int_{-zr}^{+zr} \varphi(z) \cdot z \cdot dz$$

Figure 3:
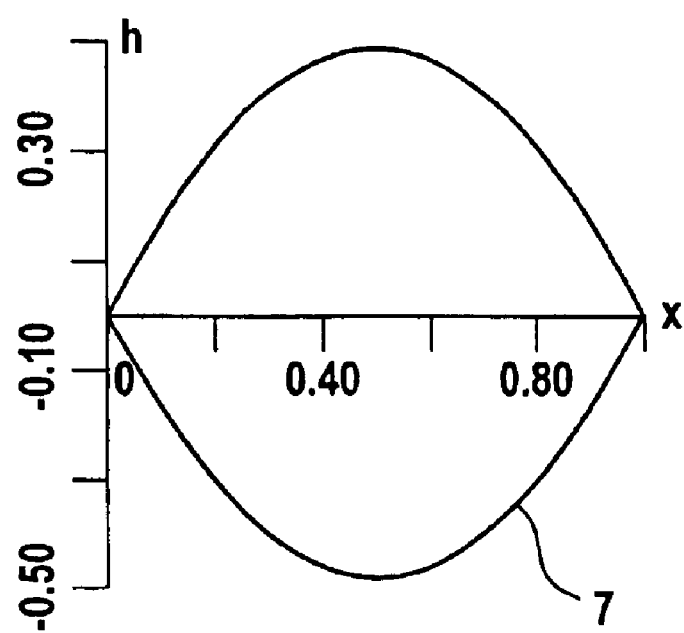
FIG. 3: the envelope of a hysteresis model.

In this context, the factor C is first selected so that the relative model hysteresis becomes 100%. The adaptation to the transducer hysteresis that is to be corrected can then additionally be carried out through a weighting function $P_{(x)}$ in a weighting circuit 4. From the thusly developed model, which essentially contains or includes the loading history, a correction or auxiliary value h is calculable for each determined measured value x. In this context, the hysteresis model essentially describes the linearity deviation from a straight line in the teardrop shape of the envelope loop. Such an envelope of the auxiliary value h over the hysteresis-affected measured value x is shown in FIG. 3 of the drawing. Thereby, this envelope 7 represents or illustrates a symmetrical teardrop shaped course or progression, of which the values are respectively calculated in the model circuit 3 according to the program in FIG. 4. In this context, the hysteresis model is described in the programming language "FORTRAN" and is input into the model computation circuit 3, which therewith calculates the respective auxiliary value h for each measured value x. Since the envelope 7 according to the model circuit 3 describes an envelope in ideal teardrop shape according to FIG. 3 of the drawing, an adaptation to unsymmetrical hysteresis curves, which deviate from this teardrop shape 7, can still be carried out. For this purpose, a weighting function is still provided, which describes a linear dependence $P_{(x)}$ through which the unsymmetries of the hysteresis curves can additionally be taken into account in the weighting circuit 4. Since an adapting factor C of the transducer hysteresis is still further contained in this weighting function $P_{(x)}$, the model computation circuit 3 can be used for all hysteresis-affected transducers.

In a following multiplying circuit 5, the weighting function $P_{(x)}$ as the form of the respective weighting factor w is multiplicatively coupled with the respective auxiliary value h and provided to a summing circuit 6 as a correction factor. This weighting factor w can, in the ideal case for an ideal teardrop shape 7 of the envelope, possess the factor 1 as described above, or can contain an adaptation of the measured hysteresis to the relative model hysteresis. Since also a linear adaptation to a deviation of the ideal teardrop shape 7 of the hysteresis model can be contained by this weighting function, the weighting function circuit 4 still additionally calculates the respective deviation relative to the determined hysteresis-affected measured value x. The total weighting factor w resulting herefrom, multiplied with the auxiliary value h gives, at the output of the multiplier 5, a correction value for taking into account the respective hysteresis error.

In the summer 5, the determined correction value is additively coupled with the correct sign with the hysteresis-affected measured value x, so that thereafter the measured value y that has been cleaned with respect to the hysteresis error is then available for further processing or for indication at the output of the summer 6.

Such a correction method can be carried out as well by means of hardware or software-based computational circuits. In this context, such a correction method is suitable both for analog as well as for digital transducer circuits or weighing scales.

Particularly, it requires no special adaptation to the special embodiment of the transducers or weighing scales, but rather it can simply be carried out by receiving or taking up the falling and rising loading characteristic curves.

What is claimed is:

1. A method for the hysteresis correction of hysteresis-affected measured values in connection with at least one transducer with at least one strain gage, which detects the strain due to a force influence on an elastic deformation body, in which the hysteresis-affected measured values are corrected by a determined hysteresis error, characterized in that a hysteresis model of the transducer is formed in a model circuit from determined loading values of loading of the transducer in a rising loading branch and a falling loading branch of an envelope of the hysteresis and from a dipole density $\phi$ of oriented elementary dipoles in an interior of the deformation body, with the aid of which hysteresis model, a respective correction value that serves for the correction of the hysteresis error is derived or calculated for each one (x) of the hysteresis-affected measured values.

2. The method according to claim 1, further characterized in that an auxiliary value h is formed from the formed hysteresis model and respectively from a respective one of the hysteresis-affected measured values in the model circuit (3), which auxiliary value h represents a value for the relative hysteresis error.

3. The method according to claim 2, further characterized in that a weighting factor w is formed from the determined loading values of the transducer (1) in a weighting circuit (4) by means of a weighting function P.

4. The method according to claim 3, further characterized in that the weighting factor w is formed from the weighting function and from a respective one of the determined hysteresis-affected measured values in the weighting circuit (4), and this weighting factor is multiplicatively coupled with the auxiliary value h and gives a value for the respective hysteresis error.

5. The method according to claim 4, further characterized in that the value of the respective hysteresis error is coupled with the respective one (x) of the hysteresis-affected measured values with a correct sign in a summing circuit (6), and gives a measured value y that is corrected by the hysteresis error.

6. The method according to claim 2, further characterized in that a weighting factor w is formed from the determined loading values of the transducer (1) and/or from an unsymmetry of the envelope (7) of the hysteresis by means of a weighting function $P_{(x)}$.

7. The Method according to claim 6, further characterized in that the weighting factor w is formed from the weighting function $P_{(x)}$ and from a respective one of the determined hysteresis-affected measured values in a weighting circuit (4), and this weighting factor is multiplicatively coupled with the auxiliary value h and gives a value for the respective hysteresis error.

8. The method according to claim 7, further characterized in that the value of the respective hysteresis error is coupled with the respective one (x) of the hysteresis-affected measured values with a correct sign in a summing circuit (6), and given a measured value y that is corrected by the hysteresis error.

9. The method according to claim 1, further characterized in that the respective one (x) of the hysteresis-affected measured values is determined as an output signal of one said transducer (1) or as an output signal of several said transducers (1) that are circuit-connected together.

10. The method according to claim 9, further characterized in that the output signal x is formed as well from a sampled analog signal or as a digital value signal.

11. An apparatus for carrying out a method for the hysteresis correction of hysteresis-affected measured values in connection with at least one transducer with at least one strain gage, which detects the strain due to a force influence on an elastic deformation body, in which the hysteresis-affected measured values are corrected by a determined hysteresis error, wherein a hysteresis model is formed from determined loading values of loading of the transducer in a rising loading branch and a falling loading branch, with the aid of which hysteresis model, and from each determined hysteresis-affected measured value, a respective correction value is derived or calculated and serves for the correction of the hysteresis error, wherein the apparatus is characterized in that a transducer (1) with strain gages is provided, of which the hysteresis-affected measured values are delivered to a model circuit (3), which forms from said measured values an auxiliary value h, which is coupled in a provided multiplying circuit (5) with the weighting factor w formed from by a provided weighting circuit (4) to form a correction value, and from which, in a provided summing circuit (6), under consideration of a respective one of the hysteresis-affected measured values, at the output of which the corrected measured value y is made available for further processing or indication.

12. The apparatus according to claim 11, further characterized in that the model circuit (3), the multiplying circuit (5), the weighting circuit (4) and the summing circuit (6) is each respectively embodied in a hardware manner as an electronic circuit.

13. The apparatus according to claim 11, further characterized in that respective functions of the model circuit (3), the multiplying circuit (5), the weighting circuit (4) and/or the summing circuit (6) are respectively embodied as program-controlled electronic computer circuits.

14. A method of processing a measured value output by a transducer including at least one strain gage on an elastic deformable body, comprising the steps:
   a) from said transducer, outputting a measured value based on a strain of said deformable body that is due to a force applied to said deformable body and that is detected by said at least one strain gage, wherein said measured value is affected by a hysteresis error caused by hysteresis of said strain that exhibits a hysteresis envelope having a rising loading curve and a falling loading curve;
   b) providing a hysteresis model of said hysteresis from determined sample loading values of a loading of said deformable body along both said rising loading curve and said failing loading curve, and based on a dipole density of oriented elementary dipoles in said deformable body;
   c) using said hysteresis model, determining a hysteresis correction value for said measured value; and
   d) applying, said hysteresis correction value or a derived value that is derived therefrom to said measured value to produce a corrected measured value from which said hysteresis error has been eliminated or reduced.

15. The method according to claim 14, wherein said step d) comprises subtracting said hysteresis correction value or said derived value from said measured value, or adding said hysteresis correction value or said derived value with a negative sign to said measured value, to produce said corrected measured value.

16. The method according to claim 14, further comprising producing a weighting value through a weighting function of said measured value, and multiplying said hysteresis correction value by said weighting value to produce said derived value, which is then applied to said measured value in said step d).

* * * * *

UNITED STATES PATENT AND TRADEMARK OFFICE
CERTIFICATE OF CORRECTION

PATENT NO. : 6,928,853 B2
DATED : August 16, 2005
INVENTOR(S) : Koenig

It is certified that error appears in the above-identified patent and that said Letters Patent is hereby corrected as shown below:

Title page,
Item [56], References Cited, FOREIGN PATENT DOCUMENTS, insert
-- DE          233876          3/1986 --;

Column 1,
Above line 13, insert the section heading -- BACKGROUND INFORMATION --;

Column 2,
Line 22, after "elementary" replace "dipole" by -- dipoles --;
Line 38, after "model, and" replace "front" by -- from --;

Column 6,
Line 61, before "according" replace "Method" by -- method --;

Column 7,
Line 5, before "a measured" replace "given" by -- gives --;
Line 33, before "by a provided" delete "from";

Column 8,
Line 21, after "said" replace "failing" by -- falling --;
Line 26, before "said hysteresis" replace "applying," by -- applying --.

Signed and Sealed this

Third Day of January, 2006

JON W. DUDAS
*Director of the United States Patent and Trademark Office*